(12) United States Patent
Järlestål

(10) Patent No.: US 8,042,343 B2
(45) Date of Patent: Oct. 25, 2011

(54) COOLING OF AVIONICS USING A FUEL TANK AND REFRIGERANT SOURCE

(75) Inventor: Anders Järlestål, Linköping (SE)

(73) Assignee: SAAB AB, Linköping (SE)

( * ) Notice: Subject to any disclaimer, the term of this patent is extended or adjusted under 35 U.S.C. 154(b) by 489 days.

(21) Appl. No.: 11/902,729

(22) Filed: Sep. 25, 2007

(65) Prior Publication Data

US 2009/0002948 A1    Jan. 1, 2009

(30) Foreign Application Priority Data

Sep. 25, 2006    (EP) .................................... 06121199

(51) Int. Cl.
*F25B 19/00*    (2006.01)

(52) U.S. Cl. ................. 62/7; 62/259.2; 62/401; 62/402; 244/135 R; 244/118.5

(58) Field of Classification Search ................. 62/259.2, 62/401, 402, 7; 244/135 R, 118.5
See application file for complete search history.

(56) References Cited

U.S. PATENT DOCUMENTS

| | | | |
|---|---|---|---|
| 3,158,197 A | 11/1964 | Leonard | |
| 4,505,124 A * | 3/1985 | Mayer | 62/180 |
| 4,966,005 A | 10/1990 | Cowell et al. | |
| 5,507,150 A * | 4/1996 | Weber et al. | 62/100 |
| 5,899,085 A | 5/1999 | Williams | |
| 6,182,435 B1 | 2/2001 | Niggemann | |
| 6,948,331 B1 | 9/2005 | Ho | |
| 2006/0162371 A1 | 7/2006 | Lui et al. | |

FOREIGN PATENT DOCUMENTS

| | | |
|---|---|---|
| GB | 903310 A | 8/1962 |
| GB | 2389174 A | 12/2003 |

OTHER PUBLICATIONS

European Search Report—Mar. 14, 2007.

* cited by examiner

*Primary Examiner* — Cheryl J Tyler
*Assistant Examiner* — Jonathan Koagel
(74) *Attorney, Agent, or Firm* — Venable LLP; Eric J. Franklin

(57) ABSTRACT

An avionics cooling system including an avionics cooling circuit operating with a liquid coolant; a fuel circuit; and a vapor cooling cycle operating with a refrigerant. The avionics cooling circuit transfers heat withdrawn from avionics to the fuel circuit, whereby the heat is dumped into fuel, and the vapor cooling cycle transfers heat that cannot be dumped into the fuel from the fuel circuit to ram air.

7 Claims, 2 Drawing Sheets

COOLING OF AVIONICS USING A FUEL TANK AND REFRIGERANT SOURCE

CROSS-REFERENCE TO RELATED APPLICATIONS

This application claims priority to European patent application 06121199.1 filed 25 Sep. 2006.

TECHNICAL FIELD

An avionics and/or power electronics cooling circuit operating with a coolant is flexibly connected to a vapour cooling cycle by means of a fuel circuit.

BACKGROUND

The technical field of the present invention relates to cooling of avionics and/or power electronics, i.e. electronics designed for use in aerospace vehicles, such as aircraft electronics. The avionics must be cooled constantly or they will overheat. Fuel or air cooling cycles are typically used for cooling of avionics. In rare cases vapour cooling circuits are used.

Air cooling circuits utilise compressed air from the aircraft engine, which is converted to be suitable for avionics cooling (temperature, pressure and humidity), and for keeping the cabin environment comfortable and pressurised. Air cooling of avionics is very energy consuming. The coefficient of performance is about 0.10-0.25, i.e. in order to withdraw a heat load of 10 kW in the avionics 40-100 kW needs to be taken from the engine.

Fuel cooling circuits utilise the aircraft fuel for direct cooling of the avionics or by means of a separate cooling circuit, in which heat is transferred from the avionics to the fuel in a heat exchanger. Fuel cooling systems are usually very energy effective. A power of 1-2 kW may be sufficient to operate a system which is to withdraw a heat load of 10 kW. However only a limited amount of heat can be transferred to the fuel, without reaching the upper limit of the fuel temperature, or that the fuel temperature raises such that it becomes unsuitable for avionics cooling.

Studies have shown that vapour cooling cycles are the most energy effective systems for cooling of avionics. The coefficient of performance is generally 1-3 (i.e. 3-10 kW needs to be taken from the engine in order to withdraw a heat load of 10 kW in the avionics).

Cooling cycles of the above types can also be combined with each other in various configurations. An example of such a combined cooling system is the system for environmental control in an aircraft shown in U.S. Pat. No. 6,948,331, which includes a number of cooling cycles connected to each other. One of the cycles is an avionics cooling loop, by means of which heat withdrawn from the avionics is transferred to an air flow of an environmental air cooling cycle. A vapour cooling cycle and an air/fuel heat exchanger are used to transfer heat from the air flow to a fuel flow, which is subsequently conducted to the engine. This system is adapted to the different conditions that occur when the engine is running or not. However, it does not take account to conditions that may arise due to variations in the heat load of the avionics. The system is also quite complicated.

SUMMARY OF THE INVENTION

The object of the present invention is thus to provide a simple and flexible avionics cooling system, that is adapted to take account of variations in the avionics heat load.

The present invention provides an avionics cooling system, which comprises an avionics cooling circuit, operating with a liquid coolant; a fuel circuit; and a vapour cooling cycle, operating with a refrigerant. The avionics cooling circuit transfers heat withdrawn from the avionics to the fuel cooling circuit, whereby the heat is dumped into the fuel, and the vapour cooling cycle transfers heat that cannot be dumped into the fuel from the fuel circuit to the ram air. The fuel circuit preferably comprises a fuel flow, which is connected to the fuel tank, and which can be isolated from the fuel tank. This is preferably performed by closure of a valve, although other means are conceivable.

In a first mode of operation, when the fuel temperature in the fuel tank is below a first threshold temperature (T1), only the avionics cooling circuit and the fuel circuit are in operation, and the fuel flow is in communication with the fuel tank, i.e. the fuel of the fuel circuit is directly communicating with the fuel of the fuel tank. In a second mode of operation, when the fuel temperature in the fuel tank is above said first threshold temperature (T1) and below a second threshold temperature (T2), which is higher than the first threshold temperature, the avionics cooling circuit and the fuel circuit are in operation and the fuel flow is in communication with the fuel tank, and the vapour cooling cycle is in operation with reduced capacity. In this mode the vapour cooling cycle assists the fuel circuit by transferring heat that cannot be taken up by the fuel to the ram air. In a third mode of operation, when the fuel temperature in the fuel tank is above said second threshold temperature (T2), the avionics cooling circuit and the fuel circuit are in operation, and the fuel circuit is isolated from the fuel of the fuel tank, and the vapour cooling cycle is in operation with full capacity. Thus, in this mode all heat transferred from the avionics is transferred to the ram air, via the fuel circuit and the vapour cooling cycle. The first threshold temperature may preferably be 35-45° C., and the second threshold temperature may preferably be 45-55° C.

The invention also relates to a method for cooling of avionics, in which heat is withdrawn from the avionics in an avionics cooler and is transferred to a fuel flow to be dumped into the fuel of a fuel tank, and heat that cannot be dumped into the fuel is transferred to the ram air by a vapour cooling cycle.

DETAILED DESCRIPTION OF THE INVENTION

Figure 1:
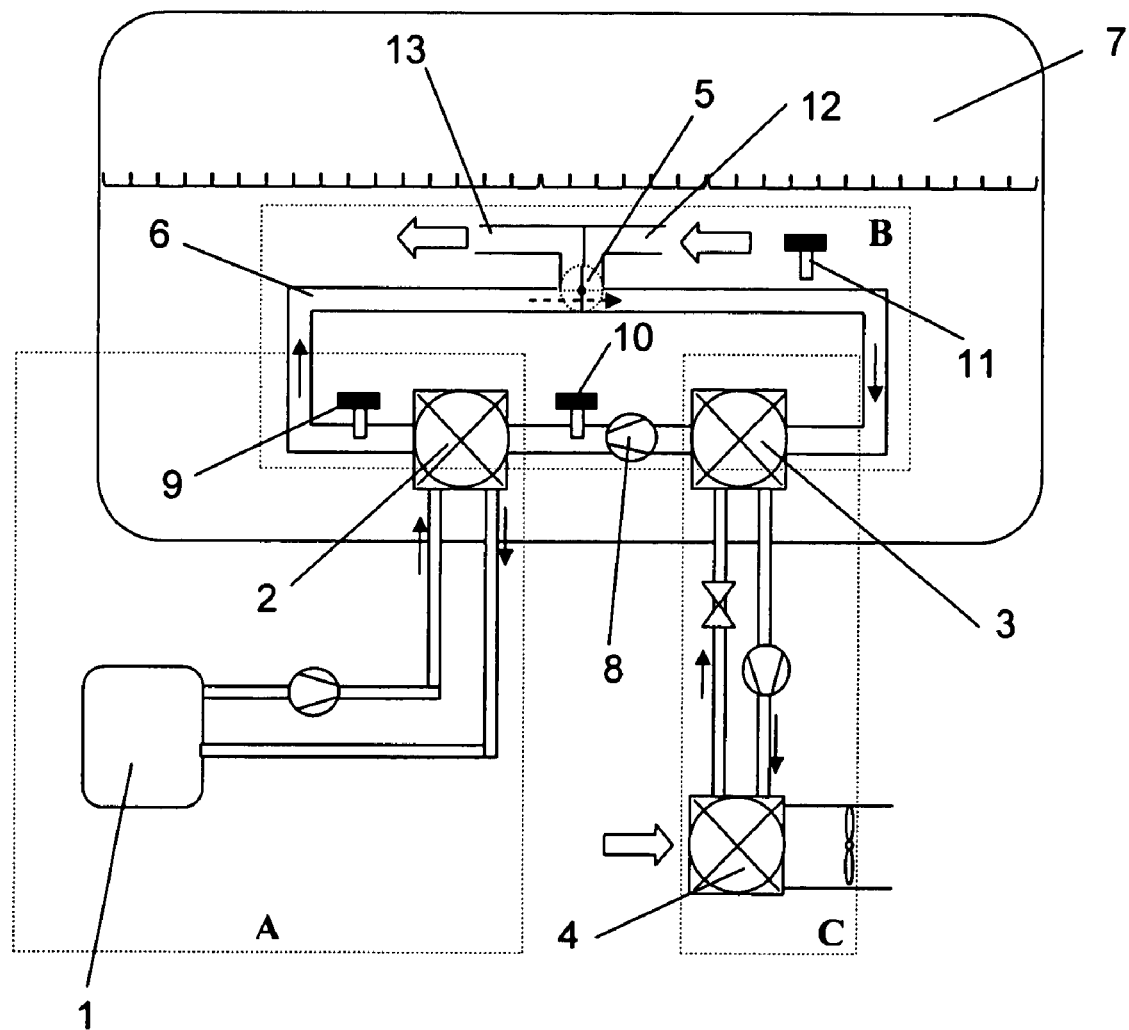
FIG. 1 is a schematic diagram of the avionics cooling system according to the invention.

The present invention relates to an avionics cooling system, which combines fuel cooling and refrigerant cooling. The system does not produce any comfort air and is therefore most suitable for aircrafts in which no comfort air is needed, such as unmanned aircraft. It may also be suitable as a complement to conventional air cooling cycles in case of high heat load, for large aircraft, such as transport or passenger aircraft, which may then be provided with both a comfort air system and a separate avionics cooling system.

The combination of fuel cooling and refrigerant cooling according to the invention provides for very high energy efficiency. The idea of the invention is a system that provides for convenient connection of the cooling cycles, such that fuel cooling is used at low temperatures in the fuel tank, and a combination of fuel cooling and refrigerant cooling is used at intermediate fuel temperatures, and at high fuel temperatures only refrigerant cooling is used.

In the present invention the avionics is cooled by a liquid coolant, such as PAO (PolyAlphaOlefins) or other glycolic blends. Thereby the inlet temperature can be kept at a favourable level compared with air cooling, for which low temperature (ca 0° C.) is more or less a demand to reduce flow levels. Liquid cooling is highly effective for cooling of avionics having high power density, small avionics equipment that generates large amounts of heat. There is an upward tendency for such avionics equipment, and thus the demand for liquid cooling will increase in the future. Cooling equipment for use in liquid cooling also have a lower weight, take less space and require less power for circulation of the coolant, as compared to air cooling.

The avionics cooling system will now be described with reference to FIG. 1, which shows the system schematically. It is emphasised that all temperatures given hereinafter are intended to serve as examples of possible temperature levels, and are by no means to be regarded as limiting the basic principle of the cooling system. In practice the temperatures will be chosen with consideration of the actual conditions. The system comprises the following components, or subsystems:

A) an avionics cooling circuit using e.g. PAO as coolant
B) a fuel circuit for flexible connection of the avionics cooling cycle and the vapour cooling cycle
C) a vapour cooling cycle, including a ram air condenser The avionics cooling circuit (A) transfers heat generated by the avionics to a fuel flow of the fuel circuit (B). The vapour cooling cycle (C) transfers heat from the fuel flew of the fuel circuit (B). The fuel circuit (B) transfers heat from the avionics cooling circuit to the fuel tank 7, and to the vapour cooling cycle (C).

The avionics cooling circuit (A) comprises an avionics bay 1, in which the avionics is cooled, and a heat exchanger 2, in which the coolant is cooled. The cooling circuit (A) uses a liquid coolant, such as PAO, which circulates between the avionics bay 1 and the heat exchanger 2. In the avionics bay, heat is transferred from the avionics to the coolant. The coolant normally flows through cooling plates or ducts which are in thermal contact with the heat source. Most efficient cooling would be achieved if the coolant is lead through the avionics resulting in direct contact with the heat source. The coolant is conducted by means of a pump to a heat exchanger 2, in which heat is transferred from the coolant to a fuel flow 6 in the fuel tank. The coolant is then circulated back to the avionics bay 1 for continued cooling of the avionics. The heat exchanger 2 is located inside the fuel tank and does also form a part of the fuel circuit. The avionics cooling circuit is in operation at all times.

The fuel circuit (B) is completely located inside the fuel tank. Heat removed from the avionics in avionics bay 1 is transferred to the fuel flow 6 via the heat exchanger 2 in the fuel circuit. Fuel from the fuel tank enters the fuel circuit through a fuel circuit inlet 12 and is conducted in the circuit by means of a pump 8. The pump 8 is in operation at all times. The fuel flow exits the fuel circuit through a fuel circuit outlet 13, and is then spread into the fuel tank. The fuel flow 6 of the fuel circuit communicates with the fuel in the fuel tank 7 via a valve 5.

The valve 5 has two different positions. In a first position, which is also referred to as the open position, the valve is positioned so that the fuel circulating in the fuel circuit is in direct communication with the fuel in the fuel tank. In a second position the valve is positioned so that the fuel circulating in the fuel circuit is isolated from the fuel in the fuel tank. This position is referred to as the closed position.

As long as the fuel temperature in the tank is sufficiently low (e.g. below 40° C., set as temperature threshold T1), all heat removed from the avionics can be taken up by the fuel. The vapour cooling cycle is then not in operation and the valve 5 is in its first or open position. If the fuel temperature rises above the threshold temperature T1, the fuel must be cooled to meet the temperature requirement of the avionics cooling circuit. Cooling of the fuel flow is then performed by the vapour cooling cycle (C), in which the fuel flow 6 is cooled in the evaporator 3. As long as the temperature in the fuel tank does not exceed a certain predetermined temperature, the vapour cooling cycle can operate at partial capacity.

The fuel flow 6 of the fuel circuit can be isolated from the fuel tank by choosing the second or closed position for the valve 5. The fuel flow then transfers heat withdrawn from the avionics directly to the vapour cooling cycle (C). Temperature sensors 9, 10, provided in the fuel flow of the fuel circuit register the fuel temperature after the heat exchanger 2, and between the heat exchanger 2 and the evaporator 3, respectively. Temperature sensor 11 provided in the fuel tank registers the fuel temperature in the fuel tank, i.e. before the evaporator. The capacity of the vapour cooling cycle is chosen based upon the temperature level of the fuel circulating in the fuel cooling cycle. The vapour cooling cycle (C) serves to keep the temperature of the fuel flow 6 at an appropriate level (e.g. below approximately 40° C.), at the inlet of the heat exchanger 2. For this purpose, the fuel flow 6 is cooled by the evaporator 3 of the vapour cooling cycle. The evaporator is located inside the fuel tank. In the evaporator 3, the refrigerant is evaporated by heat from the fuel flow, while the fuel flow is cooled. The evaporated refrigerant is conducted via a compressor to a condenser 4 (ram air cooler) in which it condenses, whereby heat is removed from the refrigerant to the ram air. The condensed refrigerant is then conducted to the evaporator via an expansion valve.

As indicated above, the avionics cooling system of the present invention is adapted for three different modes of operation. The first mode of operation is used at low fuel temperatures, below a first threshold temperature T1 (e.g. <40° C.). In this mode all heat removed from the avionics can be dumped into the fuel, and only the electrically-driven pumps of the avionics cooling circuit and the fuel circuit need power supply.

In the second mode of operation, at intermediate fuel temperatures, above the first threshold temperature T1 (e.g. 40° C.) and below a second threshold temperature T2 (e.g. 55° C.) some heat can be dumped into the fuel and some heat is removed from the system by means of the vapour cooling system which transfers the heat to the ram air. The vapour cycle system maintains the temperature level into the avionics cooling circuit at the set threshold temperature e.g. 40° C. In this mode, in addition to the pumps of the avionics cooling cycle and the fuel cooling cycle, also the electrically-driven compressor of the vapour cooling system needs power supply to some extent.

In the third mode of operation, at high fuel temperatures, above the second threshold temperature T2 (e.g. >55° C.), the valve 5 for low temperature mode is shut and the avionics cooling circuit is the directly connected to the vapour cooling cycle, whereby all heat removed from the avionics is carried overboard by means of the vapour cooling cycle. In this mode the temperature of the fuel in the fuel tank is not raised, since the fuel flow 6 is a closed cycle in this mode and does not have any contact with the fuel in the tank. The pumps of the avionics cooling circuit and the fuel cooling circuit, and the electrically-driven compressor of the vapour cooling cycle need power supply. In this mode the compressor needs full power supply.

Figure 2:
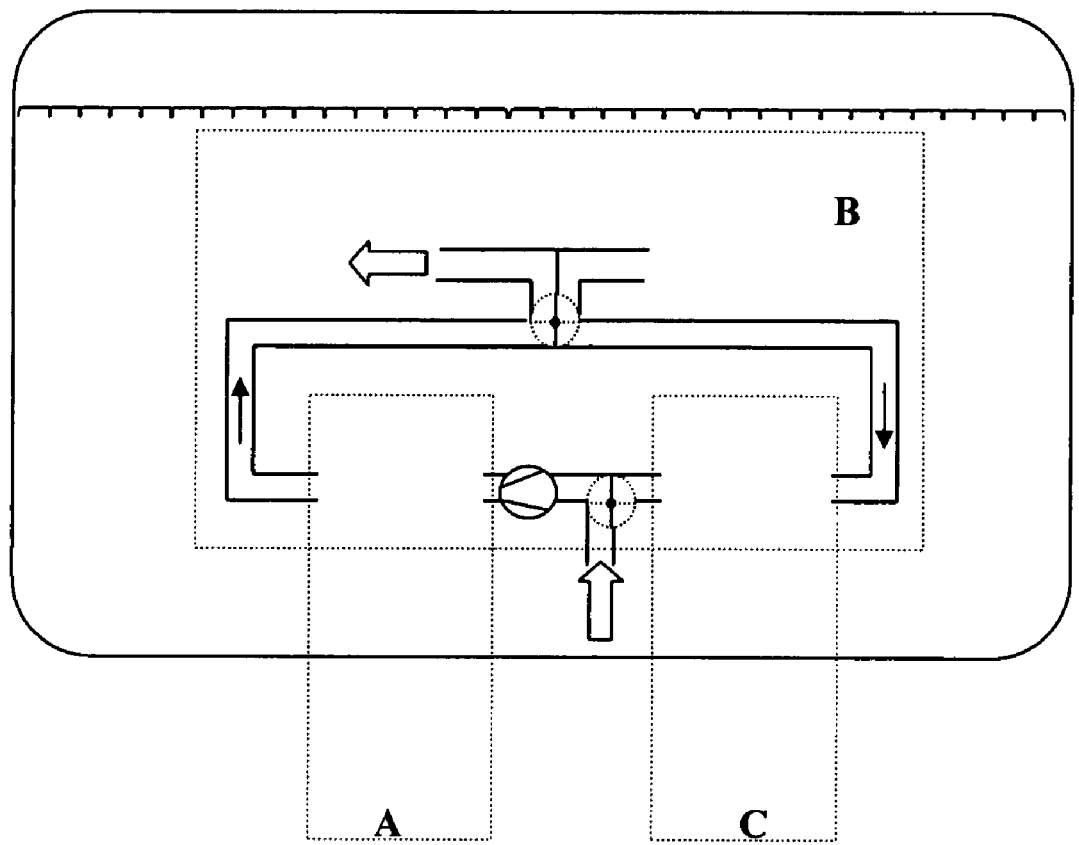
FIG. 2 is a schematic diagram of an avionics cooling system similar to the on of FIG. 1, which further includes a valve for pressure drop reduction.

When needed the vapour cooling cycle may also be used for cooling of the fuel in the fuel tank, when free capacity is available. As shown in FIG. 2, the fuel circuit may be provided with a valve in the fuel flow pipe, between the evaporator of the vapour cooling cycle and the fuel/PAO heat exchanger of the avionics cooling circuit. In this figure the avionics cooling circuit and the vapour cooling system are not shown in detail.

The fuel temperatures given above, at which the three circuits (A, B, C) operate in different constellations, are approximate. Under certain circumstances other temperature ranges may be optimal.

Example

The following example is a temperature level study for the combined fuel and vapour cycle system of the present invention. The example, which is intended for illustrative purpose only, shows how the three sub-systems of the cooling system interacts at different temperatures of the fuel in the fuel tank.

The study was based on the following parameters:
Fluid characteristics: Fuel thermal capacity (cp)=2140 J/(kg*K)) at 40° C.
PAO thermal capacity (cp)=1950 J/(kg*K)) at 40° C.
Heat Load from Avionics: 10 kW (heat generated by pumps not included)

The temperature requirements of the system were set as shown in Table 1, wherein reference numerals refer to FIG. 1.

TABLE 1

| Heat exchanger/fluid | Inlet temp. (° C.) | Outlet temp. (° C.) |
|---|---|---|
| Avionics Bay Cooling (1)/PAO | <45 | <60 |
| Fuel Heat Exch. (2)/PAO | <60 | <45 |
| Fuel Heat Exch. (2)/fuel | <40 | —[a] |
| Evaporator (3)/fuel | Fuel tank temp. and <56 | <40 |

[a] no temperature requirement for the outlet fuel temperature

The result of the study is shown in Table 2. Reference numerals refer to FIG. 1.

The study shows that at fuel tank temperatures up to 40° C., the vapour cooling cycle need not be in operation, since all heat can be dumped into the fuel. At a fuel temperature of 40-55° C. in the fuel tank, the vapour cooling cycle operates at partial capacity and at a fuel tank temperature of 55° C., the vapour cooling cycle operates at full capacity.

In this study the capacity of the vapour cooling cycle was chosen based upon the heat load (10 kW) of the avionics.

The cooling system of the present invention has low energy consumption and is simple and includes few components. At low fuel temperatures the vapour cooling cycle is not in operation, and power is then needed only in the circulation pumps for avionics coolant and the fuel flow 6. The cooling capacity of the system is adjusted to follow the heat load in the avionics bay, such that only heat actually generated is withdrawn. Thus the system operates with maximum capacity only when needed. The combination of the different cooling cycles allows effective cooling of the avionics, without the risk of exceeding the allowed upper fuel temperature limit. The vapour cooling system may also be dimensioned to have capacity for additional cooling of the fuel, in addition to the withdrawal of heat originating from the avionics. In case of failure in the vapour cooling cycle, the fuel cooling cycle can be used for emergency cooling of the avionics. In an emergency cooling mode fuel temperatures above the normal limit can often be accepted. At starting of the aircraft engine, the fuel temperature is usually low and the fuel volume is large. All heat withdrawn from the avionics can then be dumped into the fuel, and the vapour cooling cycle is not needed until the fuel temperature has risen to the first threshold temperature. At temporary high heat loads, the fuel can be used as heat accumulator, which means that the requirements of the vapour cooling cycle capacity can be reduced.

The invention claimed is:
1. An avionics cooling system, comprising:
a fuel circuit arranged inside a fuel tank, the fuel circuit comprising a valve, a heat exchanger and an evaporator, wherein the fuel circuit is arranged such that when the valve is in a first position fuel circulating in the fuel circuit is in direct communication with fuel in the fuel tank, and when the valve is in a second position the fuel circulating in the fuel circuit is isolated from the fuel tank;

TABLE 2

| | Avionics cooling circuit PAO/Fuel heat exchanger (2) | | | Fuel circuit | | | | | | |
|---|---|---|---|---|---|---|---|---|---|---|
| | | | | Fuel/PAO heat exchanger (2) | | | Vapour cooling system evaporator (3) | | | |
| Temp. in fuel tank (° C.) | PAO inlet temp. (° C.) | PAO outlet temp. (° C.) | Flow (kg/s) | Fuel inlet temp. (° C.) | Fuel outlet temp. (° C.) | Flow[c] (kg/s) | Fuel inlet temp. (° C.) | Fuel outlet temp. (° C.) | Heat load (kW) | Heat Load on Fuel[d] (kW) |
| 10 | 60 | 45 | 0.312 | 10 | 57 | 0.100 | 10 | 10 | 0 | 10 |
| 20 | 60 | 45 | 0.312 | 20 | 56 | 0.130 | 20 | 20 | 0 | 10 |
| 30 | 60 | 45 | 0.312 | 30 | 57 | 0.170 | 30 | 30 | 0 | 10 |
| 40 | 60 | 45 | 0.312 | 40 | 56 | 0.300 | 40 | 40 | 0 | 10 |
| 50 | 60 | 45 | 0.312 | 40 | 56 | 0.300 | 50 | 40 | 6.4 | 3.6 |
| 55 | 60 | 45 | 0.313 | 40 | 56 | 0.300 | 56 | 40 | 10.3 | −0.3 |
| 60[b] | 60 | 45 | 0.311 | 40 | 56 | 0.300 | 56 | 40 | 10.3 | −0.3 |
| 70[b] | 60 | 45 | 0.312 | 40 | 56 | 0.300 | 56 | 40 | 10.3 | −0.3 |

[b] Closing valve in the fuel circuit for cold mode (fuel recirculation)
[c] Maximum flow level is set to be approximately the same as for the PAO circuit
[d] Negative heat load means that the cooling machine is cooling the fuel more than the heat load contribution from the avionics an avionics cooling circuit, operating with a liquid coolant, wherein the avionics cooling circuit is configured to withdraw heat from avionics and transfer the heat to fuel in the fuel circuit via the heat exchanger; and a vapour cooling cycle operating with a refrigerant, wherein the vapour cooling cycle is configured to transfer heat from the fuel circuit to ram air via the evaporator.

2. The system according to claim 1, wherein the system runs in a first mode of operation when a fuel temperature in the fuel tank is below a first threshold temperature, in which first mode of operation only the avionics cooling circuit and the fuel circuit are in operation, and the fuel flow is in communication with the fuel tank.

3. The system according to claim 2, wherein the system runs in a second mode of operation when the fuel temperature in the fuel tank is above said first threshold temperature and below a second threshold temperature, which is higher than the first threshold temperature, in which second mode of operation the avionics cooling circuit and the fuel circuit are in operation and the fuel flow is in communication with the fuel tank, and the vapour cooling cycle is in operation with reduced capacity.

4. The system according to claim 3, wherein the system runs in a third mode of operation when the fuel temperature in the fuel tank is above said second threshold temperature, in which third mode of operation the avionics cooling circuit and the fuel circuit are in operation, and the fuel flow is isolated from the fuel tank, and the vapour cooling cycle is in operation with full capacity.

5. The system according to claim 2, wherein the first threshold temperature is 35-45° C.

6. The system according to claim 3, wherein the second threshold temperature is 45-55° C.

7. A method for cooling avionics, the method comprising:
arranging a fuel circuit inside a fuel tank, the fuel circuit comprising a valve, wherein when the valve is in a first position fuel circulating in the fuel circuit is in direct communication with fuel in the fuel tank and when the valve is in a second position the fuel circulating in the fuel circuit is isolated from fuel in the fuel tank, withdrawing heat from the avionics in an avionics cooling circuit operating with a liquid coolant, transferring the heat via a heat exchanger to the fuel flow to be dumped into fuel in the fuel tank, and transferring heat that cannot be dumped into the fuel via an evaporator from the fuel circuit to a ram air by a vapour cooling cycle operating with a refrigerant.

* * * * *